(12) United States Patent
Young

(10) Patent No.: US 7,287,280 B2
(45) Date of Patent: Oct. 23, 2007

(54) AUTOMATED SECURITY MANAGEMENT

(75) Inventor: Carl Young, New York, NY (US)

(73) Assignee: Goldman Sachs & Co., New York, NY (US)

( * ) Notice: Subject to any disclaimer, the term of this patent is extended or adjusted under 35 U.S.C. 154(b) by 852 days.

(21) Appl. No.: 10/074,583

(22) Filed: Feb. 12, 2002

(65) Prior Publication Data

US 2003/0154393 A1 Aug. 14, 2003

(51) Int. Cl.
*G06F 21/00* (2006.01)
*G06F 11/30* (2006.01)

(52) U.S. Cl. ............................... 726/25; 726/22; 726/1; 726/3

(58) Field of Classification Search ................ 726/1, 726/3, 22, 25
See application file for complete search history.

(56) References Cited

U.S. PATENT DOCUMENTS

| | | | |
|---|---|---|---|
| 5,177,342 A | | 1/1993 | Adams |
| 6,078,904 A | | 6/2000 | Rebane |
| 6,085,175 A | | 7/2000 | Gugel et al. |
| 6,119,103 A | | 9/2000 | Basch et al. |
| 6,304,973 B1 | * | 10/2001 | Williams ................. 726/3 |
| 6,542,993 B1 | * | 4/2003 | Erfani ...................... 726/1 |
| 6,971,026 B1 | * | 11/2005 | Fujiyama et al. .......... 726/25 |
| 2001/0049793 A1 | * | 12/2001 | Sugimoto ............... 713/200 |
| 2002/0188861 A1 | * | 12/2002 | Townsend ............... 713/200 |
| 2003/0065942 A1 | * | 4/2003 | Lineman et al. ........ 713/201 |

FOREIGN PATENT DOCUMENTS

| | | |
|---|---|---|
| EP | 0999489 A2 * | 12/1899 |
| WO | WO 00/75836 A2 | 12/2000 |
| WO | WO 01/55885 A2 | 8/2001 |

OTHER PUBLICATIONS

Written Opinion dated Oct. 7, 2003 for PCT/US03/03993.
Int'l Search Report dated Jun. 2, 2003 for PCT/US03/03993.
Banasiak, Michael "Don't Be Out-Scored by Your Competition", *Credit and Financial Management Review*, 2nd Quarter 2000, 8pgs., download from http://www.paynetonline.com/viewpaf.asp on Apr. 15, 2002. © 2000 Predictive Business Decision Systems, Inc.

* cited by examiner

*Primary Examiner*—Rehana Perveen
*Assistant Examiner*—Fahmida Rahman
(74) *Attorney, Agent, or Firm*—Buckley, Maschoff & Talwalkar LLC

(57) ABSTRACT

A computerized method and system for managing security risk, where risk associated with a breach of security is analyzed and quantified according to weighted risk variables. The analysis is accomplished by a computerized security risk management system that receives information relating to physical, informational, communication and surveillance risk, and structures the information such that it can be related to risk variables and a security risk level can be calculated according to a relevance of associated risk variables. The security risk level can be indicative of a likelihood that a breach of security may occur relating to a particular transaction or facility. Similarly, a security confidence level can be indicative of how secure a particular facility or practice is and a security maintenance level can be indicative of a level of security that should be maintained in relation to an analyzed subject.

24 Claims, 4 Drawing Sheets

AUTOMATED SECURITY MANAGEMENT

BACKGROUND

This invention relates to a method and system for facilitating the management of appropriate security measures associated with various business practices. In particular, the present invention relates to a computerized system and method for structuring the practice of security management by assisting business managers quantify a level of security appropriate for a given business situation and generate suggested security measures commensurate with a risk event.

The proliferation of means to exchange information coupled with an increasingly rapid pace of conducting business transactions can create uncertainty on the part of a business manager as to what security measures are appropriate for a given business situation. Where it was once possible to physically contain information within a secure building or other confine, electronic communications have greatly expanded the realm in which security measures must be made effective. Increased use of wireless communications, facsimile machines, e-mail, the Internet, file servers, and other non-traditional means of communications have expanded the possible forums where information can be intercepted and otherwise misappropriated.

In addition, sophisticated surveillance equipment and techniques have increased the capabilities of those who wish to surreptitiously gather information. Staying abreast of techniques used in corporate espionage and other efforts used to gather vital information is often beyond the scope of a business participant struggling to keep pace with a changing marketplace. Consequently, appropriate measures to counter modern surveillance are left unattended. A typical business participant may not fully understand the danger posed by corporate espionage nor do they have knowledge of how to effectively address it. Even if they are aware of effective security measures, there can be uncertainty surrounding when it becomes appropriate to implement such security measures.

Effectively determining appropriate security actions can be complicated. Risk variables, such as a geographic location and a type of computer network may seem completely unrelated to a layman business manager. However, a security expert may be concerned about a certain type of computer network, such as a wireless network, in an urban setting comprising multiple tenants and high pedestrian traffic. In the urban setting, the network may be more susceptible to violation, such as by a neighboring tenant, a pedestrian, or even a party in a neighboring building. Similarly, risk associated with a wireless network may be almost non-existent in a suburban office park setting occupied by a homogeneous tenant. Relationships between individual risk variables can require sophistication and know how far beyond the scope of an average business manager.

In addition, it would be helpful to be able quantify what measures are taken or to reassure a potential business partner with an upfront commitment to a level of security that will be applied to a business situation.

SUMMARY

Accordingly, the present invention provides a method and system for facilitating the management of security risk by identifying risk parameters that may seem unrelated, but have the potential to add to the overall level of risk. More specifically, the present invention provides for a method and system to analyze and quantify a security risk and indicate appropriate actions to address the risk. An automated security risk management (SRM) system receives information which is utilized to quantify criteria relating to physical informational, communication and surveillance risk. A security risk level is calculated using the structured information such that it is indicative of the magnitude of the consequences should a breach of security occur related to an event.

The present invention includes a computer-implemented method for managing risk related to a security risk event. Information relating to a security risk event is received by a computerized system which can structure the information received according to risk variables. The computerized system can also calculate a security level using the structured information and a set of relationships established between the risk variables.

The security level can include an indication of an amount of risk that a breach of security may occur relating to the security risk event, a security confidence level indicative of how secure a particular facility can be made relative to a particular security risk event, a security confidence level indicative of how secure a particular practice can be made relative to a particular security risk event or a security maintenance level indicative of a level of security that should be maintained in relation to an analyzed security risk event.

A suggested security measure can also be generated according to the security level and structured information. The suggested security measure can include, for example, physical protection of media containing information relating to the transaction, physical protection of a facility or building associated with the security risk, or notifying an authority regarding potential breach of security.

The suggested security measure and the security level calculated can be stored and utilized for reporting.

In another aspect of the invention, branding can be associated with the suggested security measure according to the set of relationships between the risk variables. Similarly, a level of analysis utilized in the calculation of the security level can be rated according to a classification.

The calculation can include a level of weighting associated with a category of risk variables, aggregating multiple weightings of risk variables, a relationship algorithm that determines which variables effect other variables or a relationship algorithm setting forth how data included in a first variable can effect a weighting for a second variable. The security level can also be recalculated responsive to new information received or responsive to a progression of a chronology of events.

In another aspect, a computer system for providing security risk management can include a computer server that is accessible with a network access device via a communications network and executable software stored on the server and executable on demand via the network access device. The software is operative with the server to receive information relating to security risk management criteria and calculate a security risk level.

Other embodiments can include a computer executable program code residing on a computer-readable medium or a computer data signal embodied in a digital data stream. Various features and embodiments are further described in the following figures, drawings and claims.

DETAILED DESCRIPTION

The present invention includes a computerized method and system for managing security risk, including risk related to physical, informational, communication and surveillance. Risk associated with a breach of security is analyzed and quantified according to weighted risk variables. The analysis is accomplished by a computerized security risk management (SRM) system 104 which receives information relating to physical and surveillance risk and structures the information such that it can be related to risk variables and a security risk level can be calculated according to a relevance of associated risk variables. The security risk level can be indicative of the amount of risk that a breach of security may occur relating to a particular event or facility. Similarly, a security confidence level can be indicative of how secure a particular facility or practice can be made relative to a particular security risk event and a security maintenance level can be indicative of a level of security that should be maintained in relation to an analyzed security risk event or other risk subject.

Figure 1:
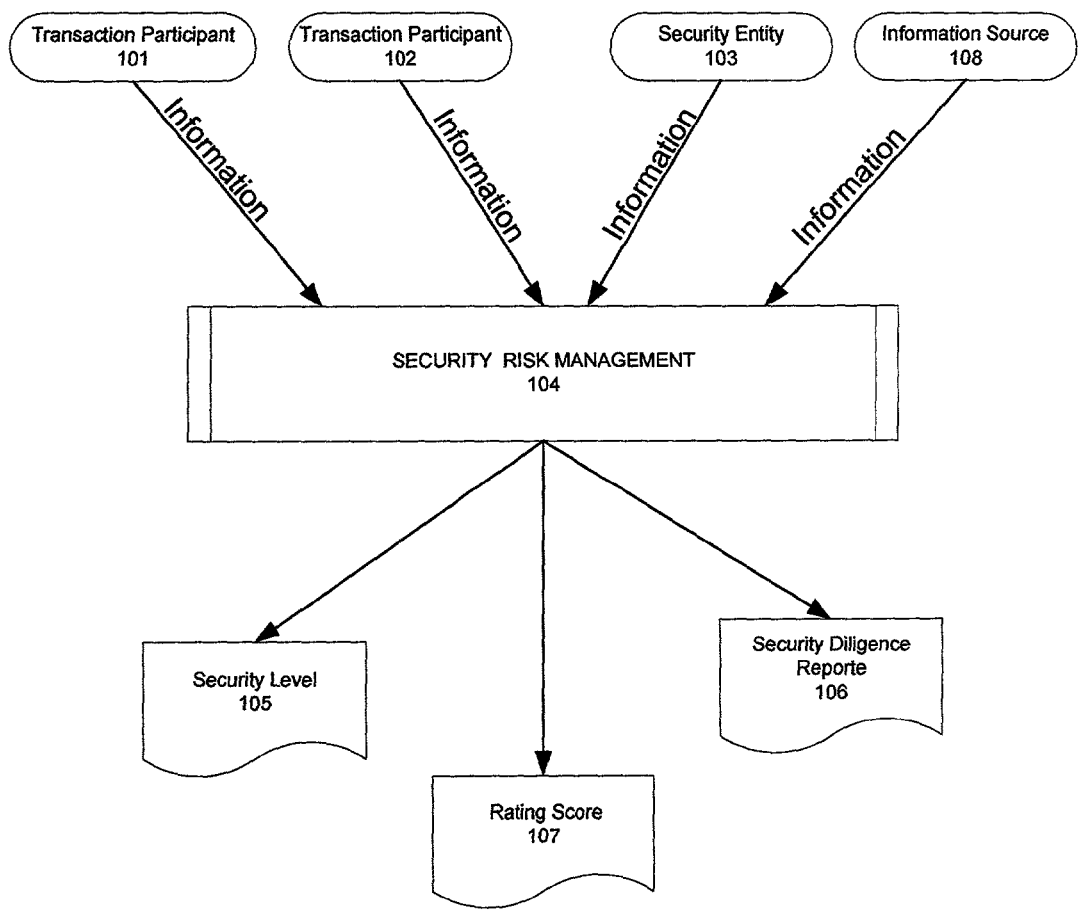
FIG. 1 illustrates a block diagram which can embody the present invention.

Referring now to FIG. 1, a block diagram of one embodiment of automated security risk management is illustrated. According to the present invention, a security risk level, a security confidence level, a security maintenance level, or other security related level (Security Level) is calculated by a SRM system 104. One or more transaction participants 101-102, security entity 103, information source 108 or other entity, input information relating to an event, facility or other subject for which a Security Level 105 is to be determined. The SRM system 104 receives the information and structures it according to security risk variables. Programmable logic is utilized to analyze the structured information according to defined relationships between the variables.

For the purposes of this application, an event can include any quantifiable phenomenon from a single transaction, such as a transfer of currency, to an entire process, such as a merger of two corporate entities. A security risk variable can include any datum wherein a change in the value of the datum can cause a change in an amount of risk.

For example, information can be entered prior to a party commencing some action or as an action progresses and causes a change in one or more conditions or variables. In one embodiment, the information can be entered in response to questions or prompts such as into a form on a graphical user interface (GUI). In another embodiment, information can be entered in free text, or scanned from documents. Once entered, the information can be parsed and analyzed with software programs, such as artificial intelligence programs in order for the information to be automatically associated with defined variables. In the event that received information is not associated with a question or prompt and also cannot be automatically associated with any defined variables, the information can be flagged and forwarded to an operator or security personnel. The security personnel can then make a manual association with a defined variable, or create a new variable and also define relationships of the new variable with other known variables.

Other relationships between variables can be predefined and programmed into executable software code. The predefined relationships can be the result of historical effects one set of datum can have upon another. In addition relationships can be formulated according to a conclusion drawn from an expert in an appropriate field of endeavor. In one embodiment, branding can take place such that a set of relationships between variables can be referred to by name. A reputation associated with a particular name can be utilized to add credibility to an analysis of a set of data, including a security level calculated and a suggested security measure generated.

For example, if XYZ Security Company has an excellent reputation based upon many years of service in the security industry, the XYZ Security Company may certify an analysis program that makes use of relationships between variables according to the expertise and experience of the XYZ Security Company or that a calculation is an XYZ calculation.

In another example, an analysis program can be rated according to how extensive an analysis will be performed upon a set of data. In this embodiment, normal day to day operations may be subjected to a moderate amount of analysis and processing. However, a very important or suspect subject may be subjected to a more extensive analysis. If desired, different levels of analysis can classified according to rating, such as, for example, a Class A rating may involve a most extensive analysis of a set of variables whereas a Class B rating correlate to a more moderate analysis and a Class C rating may correlate with a cursory analysis. If desired, an industry standard referring to risk classes can be established.

A Security Level 105 can be calculated as a result of the analysis of the variables. For example, a numerical value or other scaled weighting can be associated with particular information associated with a variable, wherein the scaled weighting is representative of risk associated with information being associated with that variable. In addition the scaled weighting can be adjusted higher or lower, or otherwise re-weighted, depending upon information received that relates to another risk variable if the risk variables can have an effect upon each other. In this manner complex associations can be developed between variables, and algorithms can be developed that reflect those associations.

For example, it may be determined that an urban location poses minimal risk, therefore this information is correlated with a low scaled weighting, or even a negative scaled weighting. However, if other information related to physical access control indicates that there are some weak aspects of physical access control, the risk associated with the weak physical access may be further increased by the urban location. The scaled weighting for the weak access control may be increased, as well as the scaled weighting for the urban location. Similarly, a use of a wireless local area network (LAN) may carry a sustainable risk level and therefore be assigned a moderate scaled weighting. However if the wireless LAN is located in a shared facility with concealed areas that could surreptitiously house equipment capable of accessing the wireless LAN, the risk associated with the wireless LAN may be increased accordingly and a scaled weighting associated with the risk would also be increased.

If desired, an additional level of weighting can be assigned to a category of variables. For example, one category of variables may include background or situational information and another electronic communications. A particular situation or transaction may place a much higher emphasis on security risk associated with the electronic communications variables. Therefore a category for the electronic communications variables would be assigned a higher rating. In one embodiment, logic embodied in computer code can dynamically adjust both category and scaled variable weightings responsive to information received.

All weightings can also be aggregated into a subject rating score 107 that is indicative of a Security Level 105 associated with a scored subject, such as an event. For example, a single value can represent a security risk level associated with a particular transaction, or a value may represent a security confidence level associated with a particular facility or corporate entity.

Relationship algorithms can include logic to determine which variables will effect other variables as well as how data entered for one variable will effect a weighting and value for another variable, such as whether data for one variable will increase risk or decrease risk associated with another variable. A relationship algorithm can also include logic to determine the extent to which a value for one variable will effect risk when combined with a value for another variable.

In another aspect of the present invention, a transaction, or other subject, can be analyzed and a scored rating, or other Security Level 105 indicator, can be calculated that indicates a level of security that should be maintained with an event. For example, information received by the SRM system 104 may indicate a high monetary value for a subject event. The subject event may also involve sensitive information that is subject to regulatory bodies, such as the Securities and Exchange Commission (SEC), for example, non-public material information relating to a corporate merger. Information can be received into the SRM system 104 that describes the subject, the parties involved, effected entities, history of the effected entities, or any other pertinent data. The SRM system 104 can associate received information with risk variables and calculate a Security Level 105 that should be maintained with activity or information that relate to the subject event.

For example, if a merger or acquisition is going to take place that involves a Fortune 500 corporation, it may be very important to the participants that proprietary information relating to the acquisition be kept secret. The SRM system 104 can receive information describing the acquisition situation and calculate a Security Level 105 that is indicative of minimum security requirements that need to be met until the occurrence of an intervening event, such as when the transaction is consummated, called off, made public, or other event.

A Security Level 105 for security maintenance can include guidelines for minimum precautions that should be implemented, including security related to physical access to a facility, personnel involved, electronic communications, or any other security risk.

If desired, a Security Level 105 for a particular subject can be predetermined, such as by agreement of the participants. In this scenario, the SRM 104 can be utilized to process information relating to the subject and assure that the predetermined security level is being adhered to. For example, a particular transaction may require a Security Level of 495 on a scale of 1 to 700, security measures that can support Security Level 495 or higher Security Level is then required. In the event that actual practices fail to sustain a predetermined level, the SRM 104 can suggest, and in some cases execute, an action commensurate with the failure.

It may also be appropriate for a Security Level 105 to change in response to new data received or as a chronology of events proceeds. For example, during the preliminary stages of merger negotiations, it may be extremely important to maintain a high level of security. However, a public announcement regarding the merger talks may put most of the material information into the public domain and therefore greatly reduce the need to maintain stringent security measures.

In another aspect of the present invention, a rating can be utilized to indicate a level of security supported by a physical location, such as a building, a conference room, or other facility. This may include any variables that effect security of a facility, including physical access variables, perimeter security, internal security, electronic communication security, or any other variables related to a physical location. In order to facilitate a choice of location for a subject transaction, a facility can be pre-qualified to support a level of security. In this manner, an appropriate facility in which work is to be hosted can be selected according to the maximum level of security the facility can support as well as the level of security required by the transaction.

The SRM 104 can also generate a suggested action that is responsive to a Security Level 105 or subject rating score 107. For example, in response to a high subject rating score 107, a suggested action may suggest implementation of additional security measures at a particular facility, or even recommend a change in facility. In response to a low risk score, the SRM system 104 may respond by approving a current situation. Intermediate scores may respond by suggesting that additional information be gathered, or that minor changes be made.

The SRM system 104 can also store, or otherwise archive SRM data, suggested actions and steps taken. This information can be useful to quantify corporate governance and diligent efforts to address high risk situations. For example the SRM system 104 can store information received, a Security Level 105, a rating score 107, and suggested actions to be taken. Security diligence reports 106 quantifying risk management procedures, executed due diligence, corporate governance or other matters can be also be generated according to the stored data.

In another aspect of the present invention, automated actions can be executed by the SRM 104 in response to a security level for a subject that exceeds a predetermined threshold, or if an actual breach of security is detected. Actions can include, for example, blocking access to documents or data relating to the transaction, encrypting electronic communications, generating an alert, notifying security personnel, or other appropriate response. In addition, the system can create a structured history relating to a particular transaction that can demonstrate due diligence and proper corporate governance. Reporting can be generated from the structured history.

Figure 2:
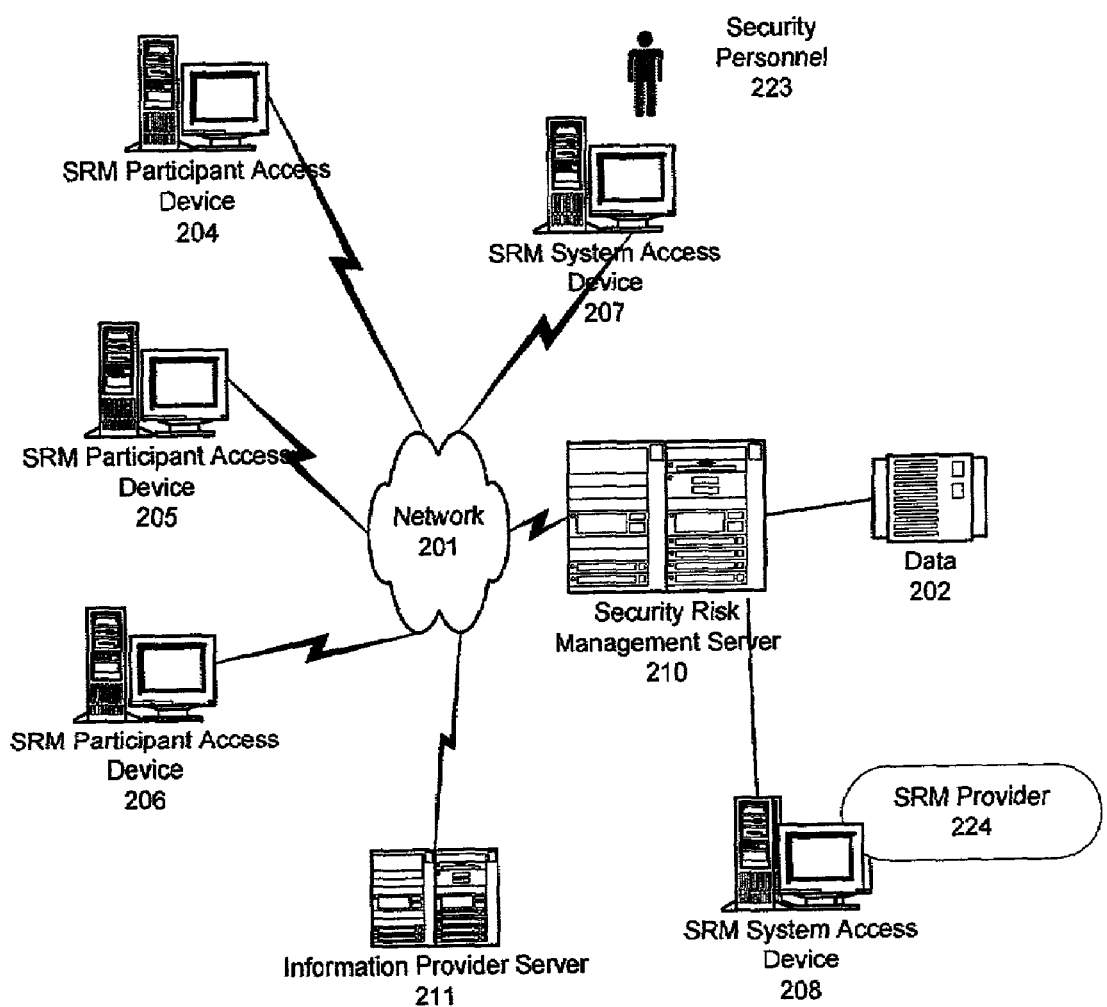
FIG. 2 illustrates a network on computer systems that can embody a security risk management system.

Referring now to FIG. 2, a network diagram illustrating one embodiment of the present invention is shown. An automated SRM system 104 can include a SRM Host 210 accessible via a distributed network 201 such as the Internet, or a private network. The SRM Host 210 can include a computerized server or other automated information sharing device. A participant 101-102, security entity 103, or other party interested in security risk management can use a computerized system or network access device 204-208 to receive, input, transmit or view information processed in the SRM Host 210. A protocol, such as the transmission control protocol internet protocol TCP/IP can be utilized to provide consistency and reliability.

Each of the network access devices can include a processor, memory and a user input device, such as a keyboard and/or mouse, and a user output device, such as a display screen and/or printer. The network access devices 204-208 can communicate with the SRM Host 210 to access data stored in databases 202 at the SRM Host 210. The network access device 204-208 may interact with the SRM Host 210 as if the host was a single entity in the network 201. However, the SRM Host 210 may include multiple processing and database sub-systems, such as cooperative or redundant processing and/or database servers, which can be geographically dispersed throughout the network 201. In some implementations, groups of network access devices 204-208 may communicate with SRM Host 210 through a local area network.

The SRM Host 210 includes one or more databases 202 storing data relating to restricted securities processing. The SRM Host 210 may interact with and/or gather data from a participant 101-102, security entity 103, other party interested in security risk management or any other person who is operating a network access device 204-208. Gathered data may be structured according to risk variables and utilized to calculate a Security Level 105.

An information provider server 211 can also be a source of information to a SRM Host 210. An information provider server 211 can include, for example, a news wire, quote system, commercial feed or source of information available electronically.

Typically a user will access the SRM Host 210 using client software executed at a network access device 204-208. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the SRM Host 210 to the client computer and executed at the client computer as part of the SRM system software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
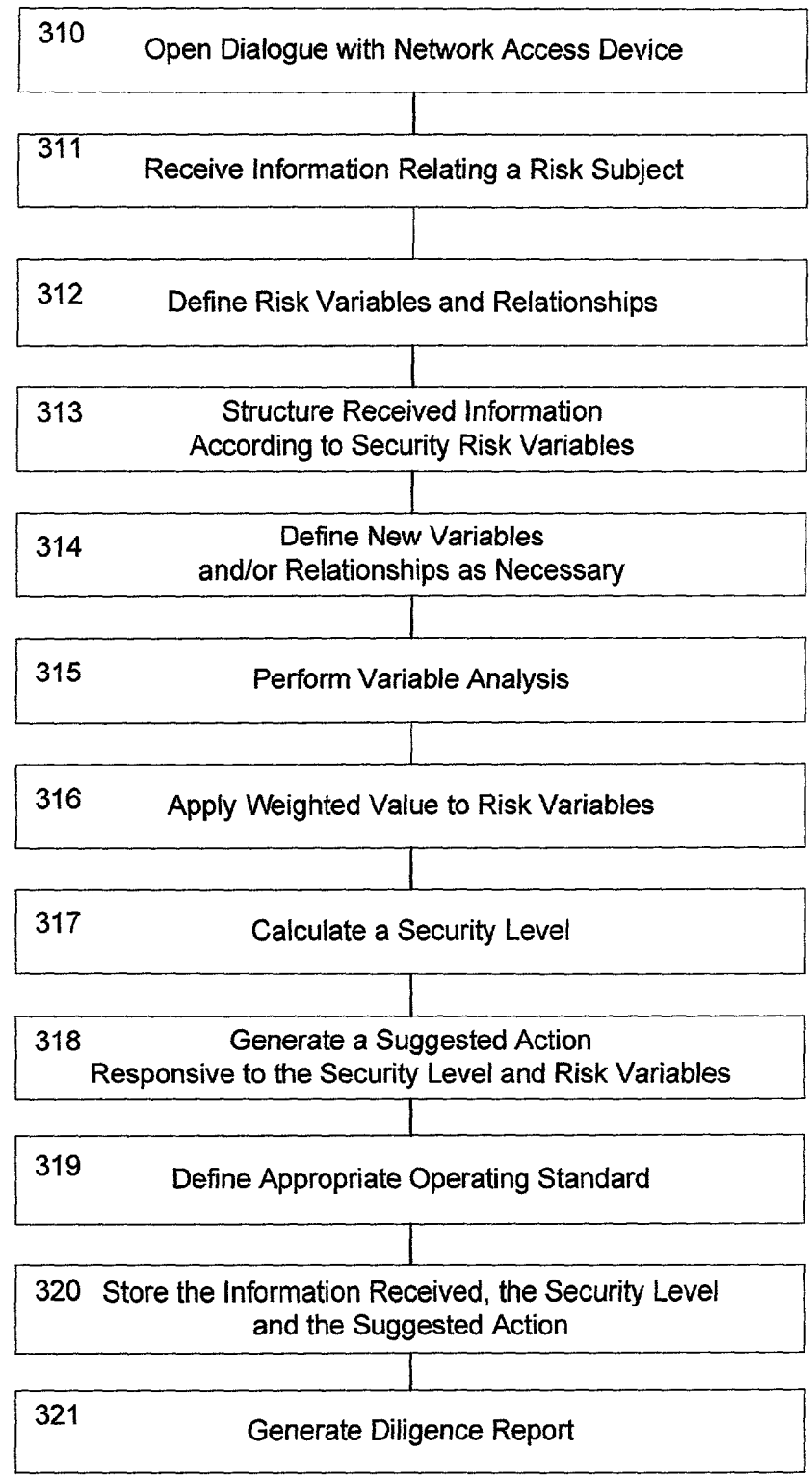
FIG. 3 illustrates a flow of exemplary steps that can be executed in practicing security risk management.

Referring now to FIG. 3, managing security risk associated with a risk event can begin with opening a dialogue 310 between a SRM host 210 and a network access device 204-208. Typically, the dialogue would be opened by presenting a GUI to a network access device accessible by person who will enter information relating to the risk event. The GUI will be capable of accepting data input via the network access device. An example of a GUI would include a series of questions relating to various aspects of security. If desired, the questions can be presented and answered via an online form.

Questions can relate to any aspect of security that might relate to the risk event, such as, for example: background and situational information, personnel security, physical access and control, perimeter and internal security and electronic communications.

Alternatively, a dialogue can also be opened with a source of electronic data such as an external database or messaging system. For example, a news feed may include information relating to a change in management at a corporation, or a change in senior management. Other pertinent news items can include information relating to a government list, a threat of violence, or information relating to state of the art security measures or equipment. In any case, the dialogue will facilitate the SRM system 104 receiving data relating to the risk event 311.

Security Risk variables associated with the risk event can be defined as well as relationships between various variables 312. Typically risk variables will be predefined by a security expert or other knowledgeable person. Information that is received may relate to more than one variable and may be entered into more than one data field or have relational links to more than one data field. For example, a response to a question on how a company makes use of a private investigative firm may also relate to a data field pertaining to verification of statements on an employment application. Relationships between variables can also be defined by the expert. Relationships can be multi-faceted and depend upon a value entered into a data field. For example, information received indicating that a company produces products with potentially adverse political implications may also relate to adequate physical security at a company facility.

Received information can be automatically associated with and structured to an appropriate risk variable or multiple risk variables according to defined relationships 313. Typically the relationships will be defined by the security expert. Association of received information to a risk variable can be accomplished via many well known methods of data field input including, for example: inputting a response to a question into one or more associated fields, key word association of received information with an appropriate field, association of quantitative data according to threshold values, formatting data with a mask or any other means of associating received data with a pertinent data field.

In the event that information received is not readily associated with a pre-defined variable data field through an automatic process, a notification can be sent to a human operator to make an appropriate association. The human operator, such as a security expert, can then define new variables and/or relationships as necessary 314. In this manner all of the data received as information can be associated with a risk variable and the risk variables can properly relate with one another.

The SRM system 104 can perform analysis on the risk variables 315 by processing relationships that have been defined in software logic code. As a result of the analysis 315, a weighted value can be applied to the risk variables 316 such that a Security Level 105 can be calculated 317.

A suggested action that is responsive to the Security Level 105 and risk variables can also be generated 318. For example, if a security risk level is high due to weakness in physical access control, the SRM System can flag this weakness and also suggest how to improve the control over physical access. In another example, if a risk event includes a pending financial transaction, such as a corporate merger, and there is a substantial profit or regulatory risk if details are disclosed, a relatively high security maintenance level may be calculated. This security maintenance level can be associated with a predefined operating standard 319. The operating standard can dictate guidelines relating to as many aspects of security as are appropriate. For example, only encrypted electronic communications may be acceptable for any communications relating to the subject. In addition, a facility that includes secured physical access, hardwired local area networks and interior meeting space may also be required in order to comply with the predefined operating standard.

A security risk diligence report can be generated 321 wherein the report can capture the risk event, variable analysis, Security Level 105 and suggested actions and other pertinent data 320. A diligence report can be useful to demonstrate good corporate governance and proper handling of security risk. The diligence report can also serve as an archival system in order to memorialize security measures taken.

Figure 4:
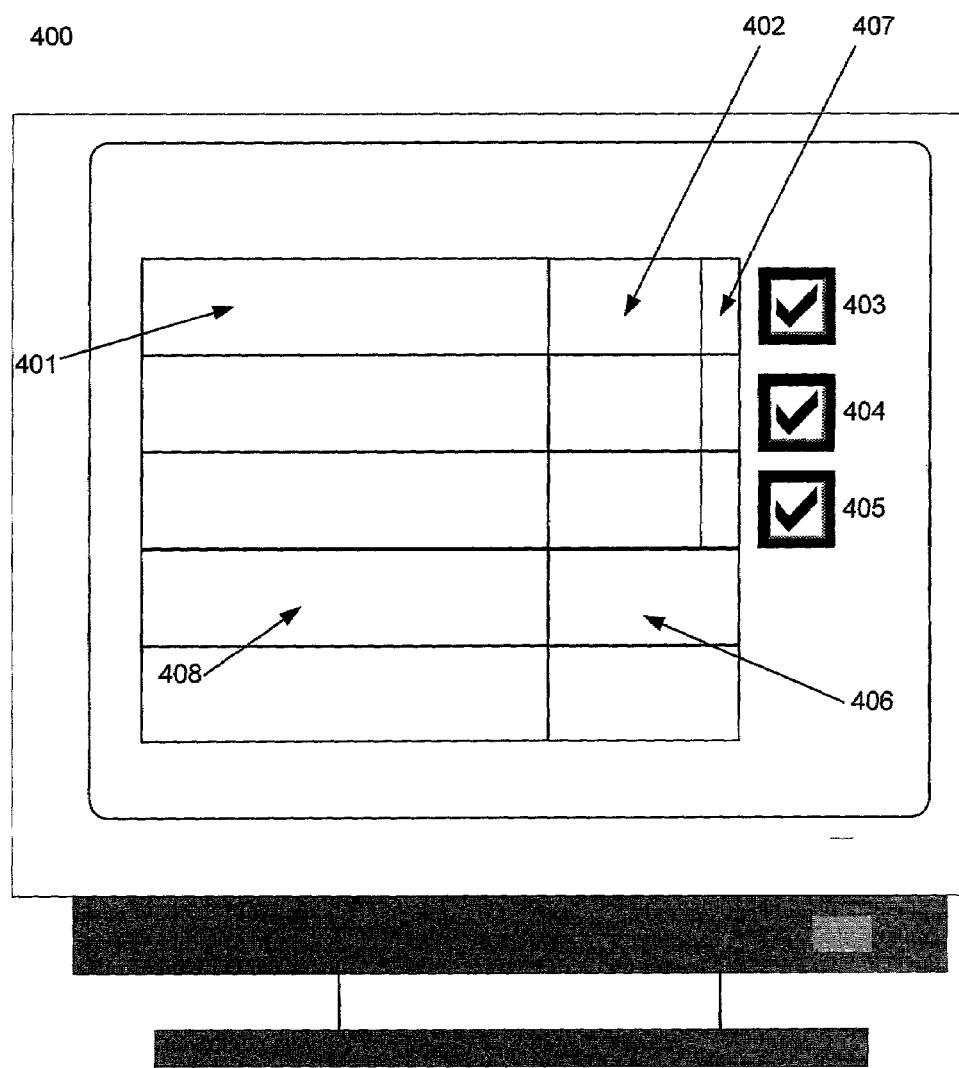
FIG. 4 illustrates an exemplary graphical user interface that can be utilized with the present invention.

Referring now to FIG. 4, an exemplary GUI for receiving security risk related information is illustrated 400. The GUI can include areas prompting for information, such as in the form of a question 401 and appropriate responses 402. A programmable user interactive device 403-405, such as a checkbox, X field, yes/no filed or other device can be utilized to indicate an answer, or otherwise input information. A category weighting 407 can also be indicated on the GUI. Typically the weighting will be predetermined. However, if desired the weighting can be modified by a user.

A GUI 400 can also include areas for displaying a Security Level 406 and an area for displaying a suggested action 408. Other features that can be presented in a GUI include a report, a summary of activity, an operating standard or other related subject matter.

A number of embodiments of the present invention have been described. Nevertheless, it will be understood that various modifications may be made without departing from the spirit and scope of the invention. For example, a network access device 204-208 can comprise a personal computer executing an operating system such as Microsoft Windows™, Unix™, or Apple MacOS™, as well as software applications, such as a web browser. A network access device 204-208 can also be a terminal device, a palm-type computer WEB access device that adheres to a point-to-point or network communication protocol such as the Internet protocol. Other examples can include TV WEB browsers, terminals, and wireless access devices (such as a 3-Com Palm VII organizer). Accordingly, other embodiments are within the scope of the following claims.

What is claimed is:

1. A computer-implemented method for managing risk related to a security risk event, the method comprising:
   receiving information relating to a particular security risk event;
   automatically processing, by a computer, the information received to associate the received information with a first set of risk variables related to the particular security risk event;
   defining a second set of risk variables related to the particular security risk event, wherein the first set of risk variables and the second set of risk variables are different;
   manually associating, in an instance the received information cannot be automatically processed to associate the received information with the first set of risk variables, the first set of risk variables with the received information that cannot be automatically processed;
   associating a portion of the received information related to the particular security risk event and not associated with the first set of risk variables with the second set of risk variables;
   calculating a security level using the processed information and a set of relationships established between the first set and second set of risk variables; and
   automatically executing an action in response to said security level exceeding a predetermined threshold.

2. The method of claim 1 wherein the security level comprises an indication of an amount of risk that a breach of security may occur relating to the particular security risk event.

3. The method of claim 1 wherein the security level comprises a security confidence level indicative of how secure a particular facility can be made relative to the particular security risk event.

4. The method of claim 1 wherein the security level comprises a security confidence level of how secure a particular practice can be made relative to the particular security risk event.

5. The method of claim 1 wherein the security level comprises a security maintenance level indicative of a level of security that should be maintained in relation to the particular security risk event.

6. The method of claim 1 additionally comprising the step of:
   generating a suggested security measure according to the security level and processed information.

7. The method of claim 6 additionally comprising the step of:
   storing the information received, the security level and the suggested security measure.

8. The method of claim 6 additionally comprising the step of:
   receiving information relating to security measures executed; and
   generating a security diligence report.

9. The method of claim 8 wherein the security diligence report comprises inquiries made relating to the particular security risk event and security measures executed responsive to the security level.

10. The method of claim 6 wherein the suggested security measure comprises physical protection of media containing infomiation relating to the particular security risk event.

11. The method of claim 6, wherein the suggested security measure comprises physical protection of a facility associated with the particular security risk event.

12. The method of claim 6, wherein the suggested security measure comprises physical protection of a building associated with a business transaction.

13. The method of claim 6, wherein the suggested security measure comprises notifying an authority regarding a potential breach of security.

14. The method of claim 6 additionally comprising the step of:
   branding the suggested security measure according to the set of relationships between the risk variables.

15. The method of claim 1 wherein level of analysis utilized in the calculation of the security level is rated according to a classification.

16. The method of claim 1 wherein the calculation comprises a level of weighting associated with a category of risk variables.

17. The method of claim 1 wherein the calculation comprises aggregating multiple weightings of the first and second sets of risk variables.

18. The method of claim 1 wherein the calculation comprises a relationship algorithm that determines which of the first and second sets of risk variables affects others of the first and second sets of risk variables.

19. The method of claim 1 wherein the calculation includes a relationship algorithm comprising how data including a first variable of the first and second sets of risk variables can affect a weighting for a second variable of the first and second sets of risk variables.

20. The method of claim 1 additionally comprising the step of:
recalculating the security level responsive to new information received.

21. The method of claim 1 additionally comprising the step of:
recalculating the security level responsive to progression of a chronology of particular security risk events.

22. A computerized system for managing risk related to a particular security risk event, the system comprising:
a computer server accessible with a system access device via a communications network; and
executable software stored on the server and executable on demand, the software operative with the server to cause the system to:
receive information relating to the particular security risk event;
automatically process the information received to associate the received information with a first set of risk variables related to the particular security risk event;
define a second set of risk variables related to the particular security risk event, wherein the first set of risk variables and the second set of risk variables are different;
manually associate, in an instance the received information cannot be automatically processed to associate the received information with the first set of risk variables, the first set of risk variables with the received information that cannot be automatically processed;
associate a portion of the received information related to the particular security risk event and not associated with the first set of risk variables with the second set of risk variables;
calculate a security level using the processed information and a set of relationships established between the risk variables; and
automatically execute an action in response to said security level exceeding a predetermined threshold.

23. The computerized system of claim 22 wherein the data is gathered via an electronic feed.

24. A computer-readable medium having computer executable program instructions stored thereon, the computer-readable medium comprising:
instructions to receive information relating to a particular security risk event;
instructions to automatically process the information received to associate the received information with a first set of risk variables related to the particular security risk event;
instructions to define a second set of risk variables related to the particular security risk event, wherein the first set of risk variables and the second set of risk variables are different;
instructions to manually associate, in an instance the received information cannot be automatically processed to associate the received information with the first set of risk variables, the first set of risk variables with the received information that cannot be automatically processed;
instructions to associate a portion of the received information related to the particular security risk event and not associated with the first set of risk variables with the second set of risk variables;
instructions to calculate a security level using the processed information and a set of relationships established between the risk variables; and
instructions to automatically execute an action in response to said security level exceeding a predetermined threshold.

* * * * *